July 22, 1924. 1,502,052
C. G. NAYLOR
SPIRALLY WOUND PIPE AND THE METHOD OF MAKING IT
Filed Feb. 10, 1921
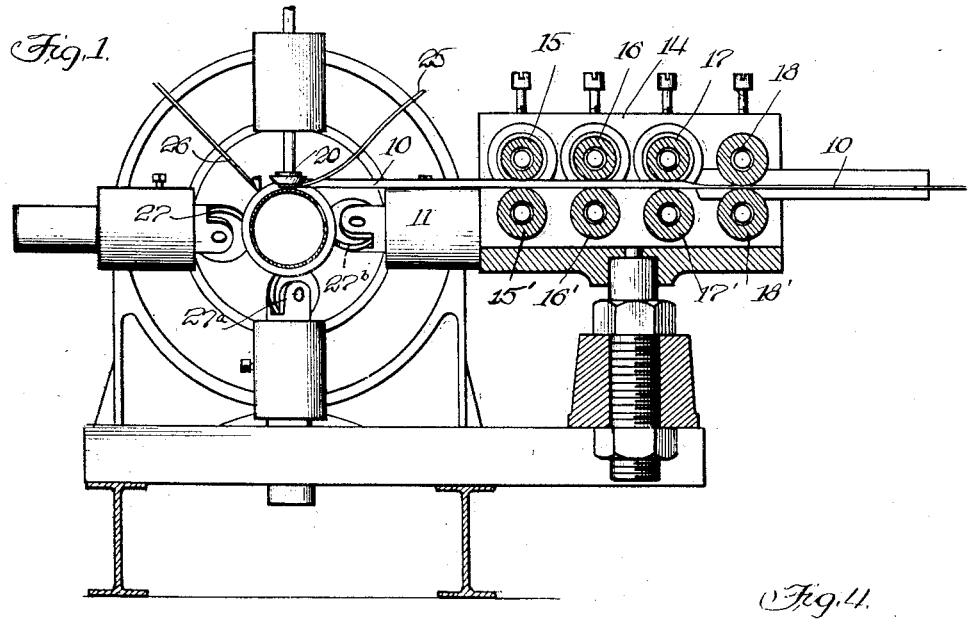
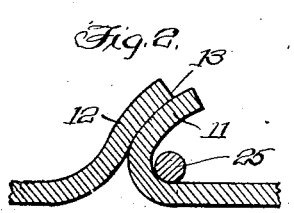 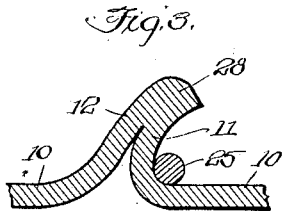 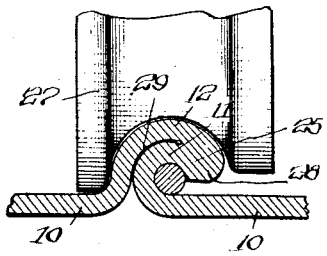
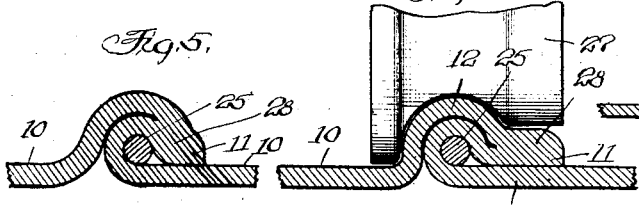 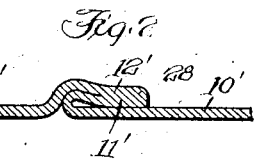
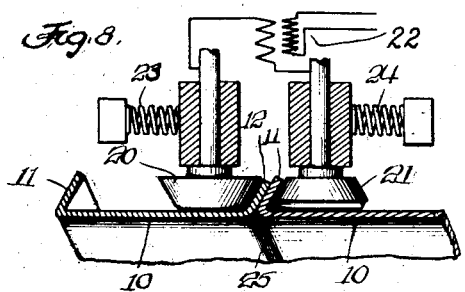 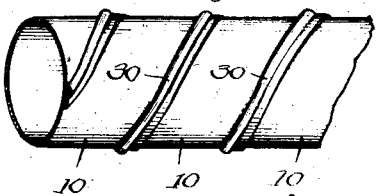
Inventor:
Carl G. Naylor
By Foré Bain Hinkle
Attys.

UNITED STATES PATENT OFFICE.

CARL G. NAYLOR, OF CHICAGO, ILLINOIS, ASSIGNOR TO NAYLOR-ROBERTSON COMPANY, A CORPORATION OF DELAWARE.

SPIRALLY-WOUND PIPE AND THE METHOD OF MAKING IT.

Application filed February 10, 1921. Serial No. 443,983.

*To all whom it may concern:*

Be it known that I, CARL G. NAYLOR, a citizen of the United States, residing at Chicago, in the county of Cook and State of Illinois, have invented certain new and useful Improvements in Spirally-Wound Pipes and the Methods of Making Them, of which the following is a specification.

The invention relates to improvements in spirally wound pipes and the method of making them.

The present invention contemplates interfolding the longitudinal edges of the spiral strip, as the strip is wound about the mandrel, and welding, brazing, soldering or otherwise joining the edges together in the interim between the beginning and ending of the binding or folding operation.

The strip is necessarily wound about a mandrel and effort has heretofore been made to overlap the flat edges of the strips and weld the overlapped parts as they lie flat upon the mandrel. Such efforts have resulted in failure because of the fact that, for one reason, the mandrel, being a large mass of metal, will conduct the heat away from the point of application so rapidly as to render the desired operation substantially impracticable, if not impossible.

In carrying my invention into effect, I first turn up the edges of the strip to form a flange at each edge which may be at an angle approximating 90 degrees from the body part, forming a channel of the strip; I then give the strip and flanges thus formed the initial curve, substantially conforming to the curve of the pipe to be made of the strip, before application of the welding or joining heat.

This is done so that there will not be thereafter any relative spiral displacement of the adjoining flanges with respect of each other if joined before curving, and so that the stretch of the flange in conforming to the curvature of the mandrel will be accomplished before the weld is made, thereby relieving the welded joint of undue and unnecessary stress tending to tear the welded members apart.

Another reason for welding at this time is that when the flanges are in substantial radial planes and the weld is made at the salient edges of adjoining flanges, the heat can escape only thru the body of the flanges and is fully available for the purpose intended.

A refinement of the invention consists in placing a wire in the interfolded part of the seam to form a continuing abutment that increases the strength of the seam and about which the two flanges are subsequently curved in the final operation, which has the effect to draw the two confronting surfaces of the flanges into more intimate contact and over the shoulder afforded by the wire, and prevent the flange from being bent at a sharp fracturing angle during the final movement of the joined flanges. This is especially valuable where the sheet metal operated upon is relatively thick, and prevents fracture of the metal at the surface of the shortest radius by increasing the length of the radii and reducing stretching. Furthermore, the wire reenforces the seam member to form an encircling armor to strengthen the pipe structure, thereby to resist stress tending to collapse the pipe.

The seam herein disclosed is especially adaptable for use on machines that are described and claimed in my Patent No. 1,288,134, granted to me on December 17, 1918, for spiral pipe making machines.

In the drawings forming a part hereof:—

Fig. 1 represents parts of a machine upon which my invention may successfully be carried into operation.

Fig. 2 shows adjacent flanges of two strips preliminarily to making the joint at the seam.

Fig. 3 shows the two flanged strips joined together.

Fig. 4 shows the joined flanges bent over the wire to complete the seam.

Figs. 5, 6 and 7 are modifications.

Fig. 8 is a sectional view showing one means of preheating the flanges before the welding operation is completed.

Fig. 9 is an elevation of a pipe, made by my new method of operation, including the seam.

A strip 10 of which the pipe is to be made has one of its flanged edges 11 bent somewhat more than ninety degrees and another parallel flange 12 bent less than ninety degrees. This is a preferable arrangement and it will be observed that the flange 12 does not extend to the end of the flange 11, leaving a space, or notch 13, within which may be placed a wire to provide metal for either welding, brazing or soldering the flanges together.

A convenient means for bending the edges of the strip 10 consists of a guide frame 14 having rollers 15, 15′, 16, 16′, 17, 17′, 18 and 18′ thereon. When the strip is placed between these rollers it is flat, but when it emerges from them, it is somewhat in the shape shown in Fig. 8 with both of its edges turned up, to a greater or less degree, forming of the strip a channel. The flanges are then heated by the angular rollers 20 and 21, by use of a transformer 22, or otherwise. The rollers 20 and 21 are yieldingly pressed together by springs 23 and 24 to bring the flanges 11 and 12 into intimate contact.

While the flanges are thus held together the roller 21 also holds the wire 25 at the root of the bend of the flange 11 and outside of the pipe. The current passes between the rollers 20 and 21 and thru the flanges sufficiently to heat them, so that when they are bent to conform to the curvature of the pipe to be made by the strip, the flanges will not be fractured and, furthermore, so that they will be hot for the subsequent welding operation. After the flanges have been properly curved and heated, in the manner described, they are welded by means of a torch 26 which may be of any approved form oxy-acetylene torch, or an electric arc, or by other approved means.

The torch is applied to the raw edges as at 13 to join the flanges together as shown at 28. The raw edges are the surfaces at right angles to the side faces of the flanges. The weld is not made by applying heat to opposite sides of the flanges.

After the welding operation is completed, as shown in Fig. 3, the flange passes under a roller 27 and is bent down into its final form as shown in Fig. 4. There may be several rollers 27, 27ª and 27ᵇ, as the operation need not be completed by the use of a single roller.

When the flanges 11 and 12 are drawn over the wire 25, after the weld has been made, as at 28, the contacting edges 29 of the adjoining flanges will be more tightly drawn together, as the outer flange 12 must be moved further proportionately than the inner flange.

The seam is shown completed at 30 in Fig. 9.

In Figs. 5 and 6 the lips of the flanges, 11 and 12, are somewhat longer and the flange 11 is brought into actual contact with the strip 10, and in Fig. 7 the joint is shown made without the use of the wire 25, and this may be done when the stock, of which the strip is composed, is relatively thin.

Having described my invention what I claim as new and desire to secure by Letters Patent, is:—

1. The method of making seams in spiral pipe which consists in bending the longitudinal edges of the strip, of which the pipe is made, to form an angular flange at each edge; forming the strip into a spiral and bringing the flanges into face to face contact so that the longitudinal edges may be welded; curving the strip flanges about the axis of the pipe; welding the longitudinal edges of adjacent flanges together; then bending the joined-together flanges toward the axis of the pipe to complete the seam.

2. The method of making seams in spiral pipe which consists in bending the longitudinal edges of the strip, of which the pipe is to be made, to form an angular flange at each edge; forming the strip into a spiral and bringing the flanges into face to face contact so that the longitudinal edges may be welded; heating adjacent contacting flanges; curving the strip and flanges about the axis of the pipe; welding the longitudinally extending adjacent, heated flanges together; then bending the joined-together flanges towards the axis of the pipe to complete the seam.

3. The method of making seams in spiral pipe which consists in bending the longitudinal edges of the strip of which the pipe is to be made, one edge being bent thru an angle more than ninety degrees, the other edge correspondingly through less than ninety degrees, to form two parallel longitudinal flanges; forming the strip into a spiral and bringing the flanges into face to face contact so that the longitudinal edges may be welded; bending the strip and flanges circumferentially into a continuous spiral; then welding the edges of the flanges together; then turning the flanges over a continuing wire to be enclosed in the seam.

4. The method of making spiral pipes which consists in bending the longitudinal edges of a strip into two parallel flanges; forming the strip into a spiral and bringing the flanges into face to face contact so that the longitudinal edges may be welded; joining the edges of adjacent outstanding flanges together, then bending the edges thus formed toward the axis of the pipe to complete the joint.

5. The method of making spiral pipes which consists in bending the longitudinal edges of a strip into two parallel flanges; forming the strip into a spiral and bringing the flanges into face to face contact so that the longitudinal edges may be welded; joining the edges of adjacent flanges together; placing a continuing wire at the base of one flange; then bending the joined edges over the shoulder formed by the wire, thereby increasing the intimacy of contact of said flanges and completing the seam.

6. A seam for a spiral pipe comprising two flanges of adjacent strips joined together; a wire laid close to the base of the flanges, outside of the strip and substantially enclosed by the overlying connected flanges.

7. A seam for a spiral pipe made of strips comprising substantially parallel flanges, of adjoining strips, welded together at their raw edges, said flanges lying approximately parallel with the body of the strips.

8. A seam for a spiral pipe made of strips comprising substantially parallel flanges of adjoining strips, welded together across their raw edges with one flange overlying the other when welded and the end of the seam thus formed substantially in contact with the body of the pipe.

In testimony whereof, I hereunto subscribed my name.

CARL G. NAYLOR.